United States Patent
Tatsuhara et al.

(10) Patent No.: US 6,872,373 B2
(45) Date of Patent: Mar. 29, 2005

(54) FLUE GAS PROCESSING APPARATUS AND DESULFURIZATION METHOD

(75) Inventors: Kiyoshi Tatsuhara, Nagasaki (JP); Akinori Yasutake, Nagasaki (JP); Takashi Kurisaki, Nagasaki (JP); Norihisa Koyayashi, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 10/467,051

(22) PCT Filed: Oct. 29, 2002

(86) PCT No.: PCT/JP02/11200

§ 371 (c)(1),
(2), (4) Date: Aug. 18, 2003

(87) PCT Pub. No.: WO03/037486

PCT Pub. Date: May 8, 2003

(65) Prior Publication Data

US 2004/0071621 A1 Apr. 15, 2004

(30) Foreign Application Priority Data

Oct. 29, 2001 (JP) .................................... 2001-330279
Oct. 29, 2001 (JP) .................................... 2001-330281

(51) Int. Cl.[7] .................. B01D 53/50; B01D 53/86; B01J 21/18; C01B 17/78; C01B 17/80
(52) U.S. Cl. .............. 423/244.03; 422/112; 422/171; 422/172; 422/177; 422/180; 423/244.01; 423/244.09; 423/522; 423/555
(58) Field of Search ............ 423/244.01, 244.03, 423/244.09, 522, 555; 422/168–172, 177, 180, 112

(56) References Cited

U.S. PATENT DOCUMENTS 6,106,791 A * 8/2000 Mochida et al. ......... 423/239.1
6,521,200 B1 * 2/2003 Silveston et al. ........ 423/512.1
6,616,905 B1 * 9/2003 Kawamura et al. .... 423/244.01
6,814,948 B1 * 11/2004 Yasutake et al. ....... 423/244.03

FOREIGN PATENT DOCUMENTS

| JP | 11-347351 | * 12/1999 |
| JP | 11-347354 | 12/1999 |
| JP | 11-347362 | * 12/1999 |
| JP | 2000-93742 | 4/2000 |
| JP | 3272366 | 1/2002 |

OTHER PUBLICATIONS

Full Translation of JP 11–347351 (published Dec. 21, 1999).*

(Continued)

Primary Examiner—Stanley S. Silverman
Assistant Examiner—Ardith E Hertzog
(74) Attorney, Agent, or Firm—Oblon, Spivak, McClelland, Maier & Neustadt, P.C.

(57) ABSTRACT

A flue gas processing apparatus for removing sulfur oxide contained in a gas, including a desulfurization tower through which the gas flows, the desulfurization tower including a catalyst unit having at least one activated carbon fiber board which adsorbs the sulfur oxide and a water-supply device configured to supply water to the catalyst unit so as to form sulfuric acid from the sulfur oxide adsorbed to the at least one activated carbon fiber board, the water-supply device being positioned above the catalyst unit in the desulfurization tower, and a pressurizing device configured to apply pressure to the gas supplied to the desulfurization tower so as to flow the gas through the catalyst unit by the pressure.

17 Claims, 15 Drawing Sheets

OTHER PUBLICATIONS

Full Translation of JP 11–347354 (published Dec. 21, 1999).*

Full Translation of JP 11–347362 (published Dec. 21, 1999).*

Full Translation of JP 2000–093742 (published Apr. 4, 2000).*

Machine Translation of JP 11–347351 (corresponding to original document cited above).*

Machine Translation of JP 11–347354 (corresponding to original document cited on enclosed PTO–1449).*

Machine Translation of JP 11–347362 (corresponding to original document cited above).*

Machine Translation of JP 2000–093742 (corresponding to original document cited on enclosed PTO–1449).*

* cited by examiner

FLUE GAS PROCESSING APPARATUS AND DESULFURIZATION METHOD

TECHNICAL FIELD

The present invention relates to a flue gas processing apparatus for removing sulfur oxides ($SO_x$) contained in a discharge gas generated by a boiler, a gas turbine, an engine, an incinerator, or a similar facility combusting a fuel such as coal or heavy oil; and to a desulfurization method for removing sulfur oxides ($SO_x$) contained in a discharge gas.

BACKGROUND ART

Sulfur oxides ($SO_x$) such as sulfur dioxide are contained in discharge gases generated by thermal power stations; plants such as chemical-production plants, metal-processing plants, sintering plants, and paper-making plants; and gas turbines, engines, incinerators, and similar facilities provided with a boiler employing a fuel such as coal or heavy oil. Thus, a flue gas processing apparatus is employed in order to remove $SO_x$ contained in discharge gases. Such a conventional flue gas processing apparatus removes $SO_x$ contained in a discharge gas, by causing $SO_x$ to be adsorbed by a porous carbon material such as activated carbon fiber, oxidizing a sulfur component by oxygen contained in the discharge gas in the presence of the porous carbon material serving as a catalyst unit, and absorbing the oxidation product in water, to thereby form sulfuric acid, which is removed from the porous carbon material.

However, the aforementioned conventional flue gas processing apparatus including a catalyst unit formed of porous carbon material has the problem that its processing efficiency is low. In order to solve the problem, there has been proposed a flue gas processing apparatus containing a catalyst unit formed of plate-like activated carbon fiber sheets and corrugated activated carbon fiber sheets, which are alternatingly juxtaposed. In the apparatus, water is added dropwise to activated carbon fiber contained in the catalyst unit, and a discharge gas is caused to pass through conduits provided between the sheets, whereby a sulfur component is effectively removed in the form of sulfuric acid. However, there remains a demand for further enhancement in processing efficiency of the above flue gas processing apparatus.

In order to meet the demand, an object of the present invention is to process sulfur oxides at higher efficiency.

DISCLOSURE OF THE INVENTION

The present invention provides a flue gas processing apparatus including a catalyst unit formed of at least one activated carbon fiber board, and water-supply means for supplying, to the catalyst unit, water for forming sulfuric acid, the catalyst unit being provided in the apparatus in the form of a tower through which a discharge gas containing sulfur oxide passes, the water-supply means being provided above the catalyst unit or in an upper section of the unit and in the apparatus in the form of a tower, characterized in that the activated carbon fiber board provided in the catalyst unit is formed by alternatingly juxtaposing one or more plate-like activated carbon fiber sheets and one or more corrugated activated carbon fiber sheets so as to provide vertically extending conduits, and in that the flue gas processing apparatus comprises pressurizing means for applying pressure to the discharge gas, to thereby cause the gas to pass through the catalyst unit.

The pressurizing means may be compressing means for compressing the discharge gas, thereby causing the gas to pass through the catalyst unit. In addition, the flue gas processing apparatus may comprise water-pressurizing means for applying pressure to water for forming sulfuric acid, to thereby supply the water to the catalyst unit. The flue gas processing apparatus may further comprise another pressurizing means; i.e., resistance means for imparting flow resistance to an outlet gas discharged from the apparatus in the form of a tower, the resistance means being provided in an outlet line for feeding the outlet gas discharged from the apparatus in the form of a tower. Alternatively, the catalyst unit may be accommodated in a pressurizing chamber in which a desired pressure is produced, and the discharge gas is caused to pass through the pressurizing chamber and water is supplied to the pressurizing chamber. In addition, the flue gas processing apparatus may further contain pressure-reducing means for reducing pressure in the pressurizing chamber, to thereby remove fluid contained in the chamber.

The flue gas processing apparatus according to the present invention may have, in one or more corrugated activated carbon fiber sheets serving as sidewalls of the conduits, at least one hole which allows passage of fluid between the conduits.

In the flue gas processing apparatus according to the present invention, the catalyst unit may be formed of a plurality of the activated carbon fiber boards which are vertically disposed.

The present invention provides a desulfurization method including causing a discharge gas containing sulfur oxides to pass through a catalyst unit formed of at least one activated carbon fiber board and supplying water for forming sulfuric acid, characterized by comprising applying pressure to the discharge gas, to thereby cause the gas to pass through the catalyst unit. The desulfurization method further comprises applying pressure to the water for forming sulfuric acid, to thereby supply the water.

The present invention also provides a desulfurization method comprising applying pressure to a discharge gas containing sulfur oxides, to thereby cause the gas to pass through vertically extending conduits formed by alternatingly juxtaposing one or more plate-like activated carbon fiber sheets and one or more corrugated activated carbon fiber sheets forming an activated carbon fiber board provided in a catalyst unit, and applying pressure to water for forming sulfuric acid, to thereby supply the water.

The present invention also provides a desulfurization method including causing a discharge gas containing sulfur oxides to pass through a catalyst unit formed of at least one activated carbon fiber board and supplying water for forming sulfuric acid, characterized by comprising applying pressure to the catalyst unit, to thereby cause the discharge gas to pass through the catalyst unit, and reducing the pressure applied to the catalyst unit, to thereby discharge material contained in the catalyst unit.

The present invention also provides a flue gas processing apparatus including a catalyst unit formed of at least one activated carbon fiber board, and water-supply means for supplying, to the catalyst unit, water for forming sulfuric acid, the catalyst unit being provided in the apparatus in the form of a tower through which a discharge gas containing sulfur oxide passes, the water-supply means being provided above the catalyst unit or in an upper section of the unit and in the apparatus in the form of a tower, characterized in that the activated carbon fiber board provided in the catalyst unit is formed by alternatingly juxtaposing one or more plate-like activated carbon fiber sheets and one or more corrugated activated carbon fiber sheets so as to provide vertically extending conduits, and in that one or more corrugated activated carbon fiber sheets serving as sidewalls of the conduits have at least one hole which allows passage of the fluid between the conduits. The catalyst unit may be formed of a plurality of the activated carbon fiber boards which are vertically disposed.

BEST MODES FOR CARRYING OUT THE INVENTION

Best modes for carrying out the present invention will next be described with reference to the drawings.

Figure 1:
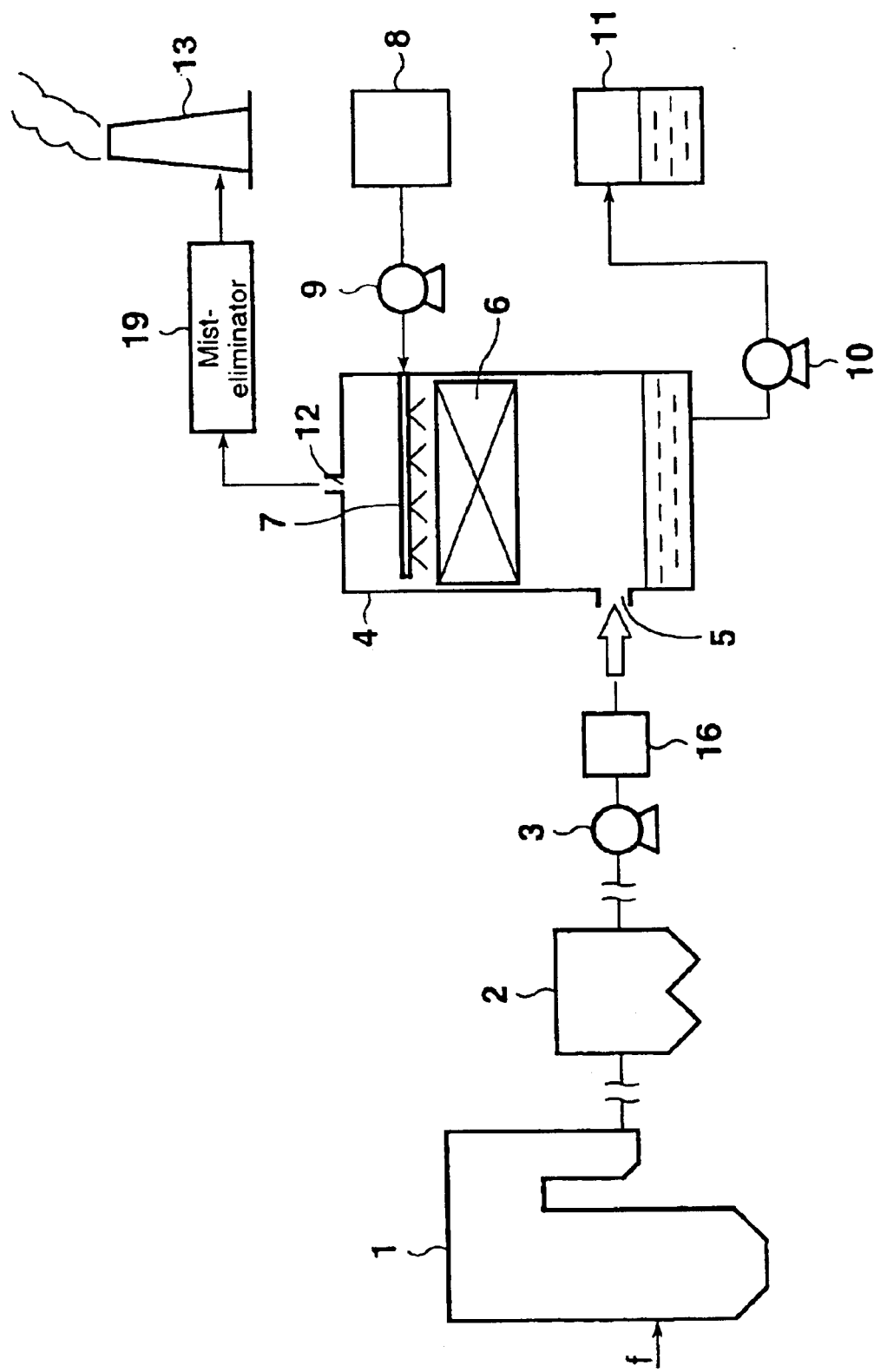
FIG. 1 is a system configuration of a discharge gas processing system employing a flue gas processing apparatus according to one embodiment of the present invention.

With reference to FIG. 1, a discharge gas process system employing the flue gas processing apparatus according to a first embodiment of the present invention will be described. According to the present invention, pressure is applied to the discharge gas to be processed, in order to promote desulfurization reaction.

As shown in FIG. 1, a boiler 1; for example, a boiler for generating steam for driving a steam turbine (not illustrated) of a thermal power plant, combusts fuel f (e.g., coal or heavy oil) in its furnace. A discharge gas generated from the boiler 1 contains sulfur oxides ($SO_x$). The discharge gas undergoes a $NO_x$ removal process by means of an $NO_x$ removal unit (not illustrated), is cooled by means of a gas heater, and subsequently undergoes a soot removal process by means of a soot collector 2.

Pressure is applied to the soot-removed discharge gas by means of a compressor 3 serving as pressurizing means, and the gas is fed to a desulfurization tower 4 serving as a processing apparatus in the form of a tower, via an inlet 5 provided in a lower section of the tower. The thus-pressure-elevated discharge gas may be treated in a humidifying-cooling apparatus 16, where water is added in a sufficient amount, to thereby yield a discharge gas in saturated vapor form. The thus-humidified discharge gas may contain mist. The desulfurization tower 4 contains therein a catalyst unit 6 formed of at least one activated carbon fiber board, and water for forming sulfuric acid is supplied to the catalyst unit 6 from a water-supplying nozzle 7 provided above the catalyst unit. Water is supplied from a water tank 8 to the water-supplying nozzle 7 by use of a pressurizing pump 9 such that the pressure of supplied water is elevated to a suitable pressure determined in accordance with the pressure of the discharge gas. Water-supply means includes the water-supplying nozzle 7, the water tank 8, and the pump 9.

The discharge gas is introduced from the lower section of the tower and caused to pass through the catalyst unit 6 onto which water has been supplied, whereby $SO_x$ contained in the discharge gas is removed through reaction. The discharge gas which has passed through the catalyst unit 6 is discharged from an outlet 12, and mist contained in the discharged gas is removed by a mist-eliminator 19, whereby generation of white smoke is suppressed. The thus-treated discharge gas is released to the air through a smokestack 13. The mist-eliminator 19 may be omitted.

On a surface of the activated carbon fiber board contained in the catalyst layer 6, desulfurization proceeds in accordance with, for example, a following reaction mechanism which includes:

(1) adsorption of sulfur dioxide ($SO_2$) by the activated carbon fiber board contained in the catalyst layer 6;

(2) oxidation of the adsorbed sulfur dioxide ($SO_2$) with oxygen ($O_2$) (may be supplied separately) contained in the discharge gas, to thereby form sulfur trioxide ($SO_3$);

(3) dissolution of the resultant sulfur trioxide ($SO_3$) in water ($H_2O$), to thereby form sulfuric acid ($H_2SO_4$); and (4) release of the resultant sulfuric acid ($H_2SO_4$) from the activated carbon fiber board.

The overall reaction is expressed as follows.

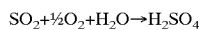

$$SO_2 + \tfrac{1}{2}O_2 + H_2O \rightarrow H_2SO_4$$

The thus-released sulfuric acid ($H_2SO_4$) is dilute sulfuric acid and is discharged into a sulfuric acid tank 11 via a discharge pump 10. As described above, desulfurization of the discharge gas is performed by causing, by means of the catalyst unit 6 for oxidation, absorption of sulfur dioxide ($SO_2$) contained in the discharge gas, reacting the oxidation product with water ($H_2O$), to thereby form sulfuric acid ($H_2SO_4$), and releasing the sulfuric acid from the catalyst unit.

Figure 2:
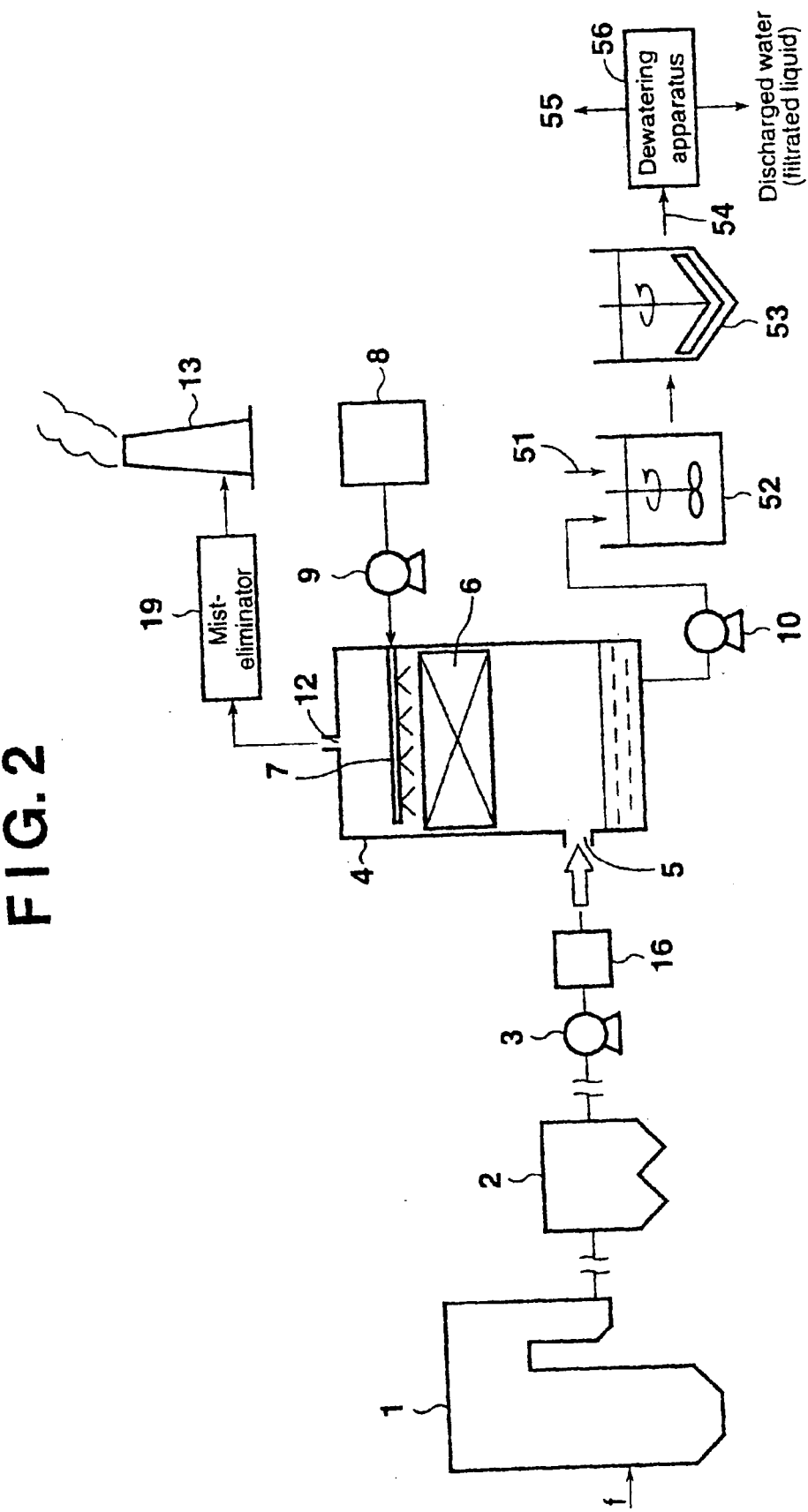
FIG. 2 is a system configuration of a discharge gas processing system according to another embodiment.

With reference to FIG. 2, a discharge gas processing system according to another embodiment of the present invention will be described. Herein, the same structural members as employed in the discharge gas processing system shown in FIG. 1 are denoted by the same reference numerals, and repeated descriptions thereof are omitted.

According to the discharge gas processing system shown in FIG. 2, sulfur oxides contained in a discharge gas are removed by means of a desulfurization apparatus, whereby sulfuric acid is formed, and lime slurry is fed to the resultant sulfuric acid, to thereby produce gypsum.

As shown in FIG. 2, the system includes a gypsum reaction tank 52 for storing dilute sulfuric acid fed from a desulfurization tower 4 via a discharge pump 10 and for depositing gypsum by reaction with supplied lime slurry 51. In addition, a settling tank 53 is also provided for settling gypsum deposited in the gypsum reaction tank 52. Gypsum slurry 54 formed in the settling tank 53 is transferred to a dewatering apparatus 56, where water is removed from the gypsum slurry, to thereby yield gypsum 55. In the discharge gas processing system shown in FIG. 1, sulfuric acid obtained through desulfurization is used as a sulfuric acid product. However, in the discharge gas processing system shown in FIG. 2, lime slurry 51 is fed to the produced sulfuric acid, thereby forming gypsum slurry 54, followed by dehydration, to thereby yield a gypsum product 55.

The structure of the activated carbon fiber board contained in the catalyst unit 6 will be described with reference to FIGS. 3 to 7.

An activated carbon fiber board 20 is formed by alternatingly juxtaposing plate-like activated carbon fiber sheets 21 and corrugated (continuous V-shaped waves) activated carbon fiber sheets 22. Spaces extending straight and provided between two sheets serve as conduits 15, with the conduits 15 extending vertically. The plate-like activated carbon fiber sheets 21 and the corrugated activated carbon fiber sheets 22 are formed by mixing cotton-form activated carbon fiber (e.g., pitch-derived or phenol-derived carbon fiber) with a binder and forming the mixture into a sheet. In the case where the corrugated activated carbon fiber sheet 22 is formed, the sheet is worked by use of a corrugator. Subsequently, the thus-formed sheets are heated in a non-oxidizing atmosphere (e.g., nitrogen) at high temperature (e.g., 600° C. to 1,200° C.), to thereby yield activated carbon fiber sheets for use in desulfurization. Briefly, a highly hydrophobic surface of activated carbon fiber is provided through heat treatment, so as to readily adsorb sulfur dioxide ($SO_2$) and rapidly release formed sulfuric acid ($H_2SO_4$) from activated carbon fiber.

The thus-heat-treated plate-like activated carbon fiber sheets 21 and corrugated activated carbon fiber sheets 22 are alternatingly juxtaposed, and the peak of each corrugated activated carbon fiber sheet 22 is joined to the plate-like activated carbon fiber sheet 21 through melt adhesion of the binder, to thereby produce a carbon fiber board module of predetermined size. Since the peak of each corrugated activated carbon fiber sheet 22 is joined to the plate-like activated carbon fiber sheet 21 through melt adhesion of the binder, no additional adhesive, such as an organic substance, is used. Thus, adverse effect of the adhesive on desulfurization reaction is eliminated, and reliability of joining is enhanced, thereby eliminating the effect of pressure loss.

In one mode, four modules of the activated carbon fiber board 20 are juxtaposed such that the conduits 15 are disposed vertically, to thereby yield one unit. Two units are stacked, and the stacked units are placed and immobilized in a casing. Briefly, a plurality of activated carbon fiber boards 20 are disposed and stacked in a vertical direction, to thereby provide the catalyst unit 6. Thus, the size of each activated carbon fiber board 20 can be reduced, thereby facilitating assembly of the catalyst unit.

Figure 4:
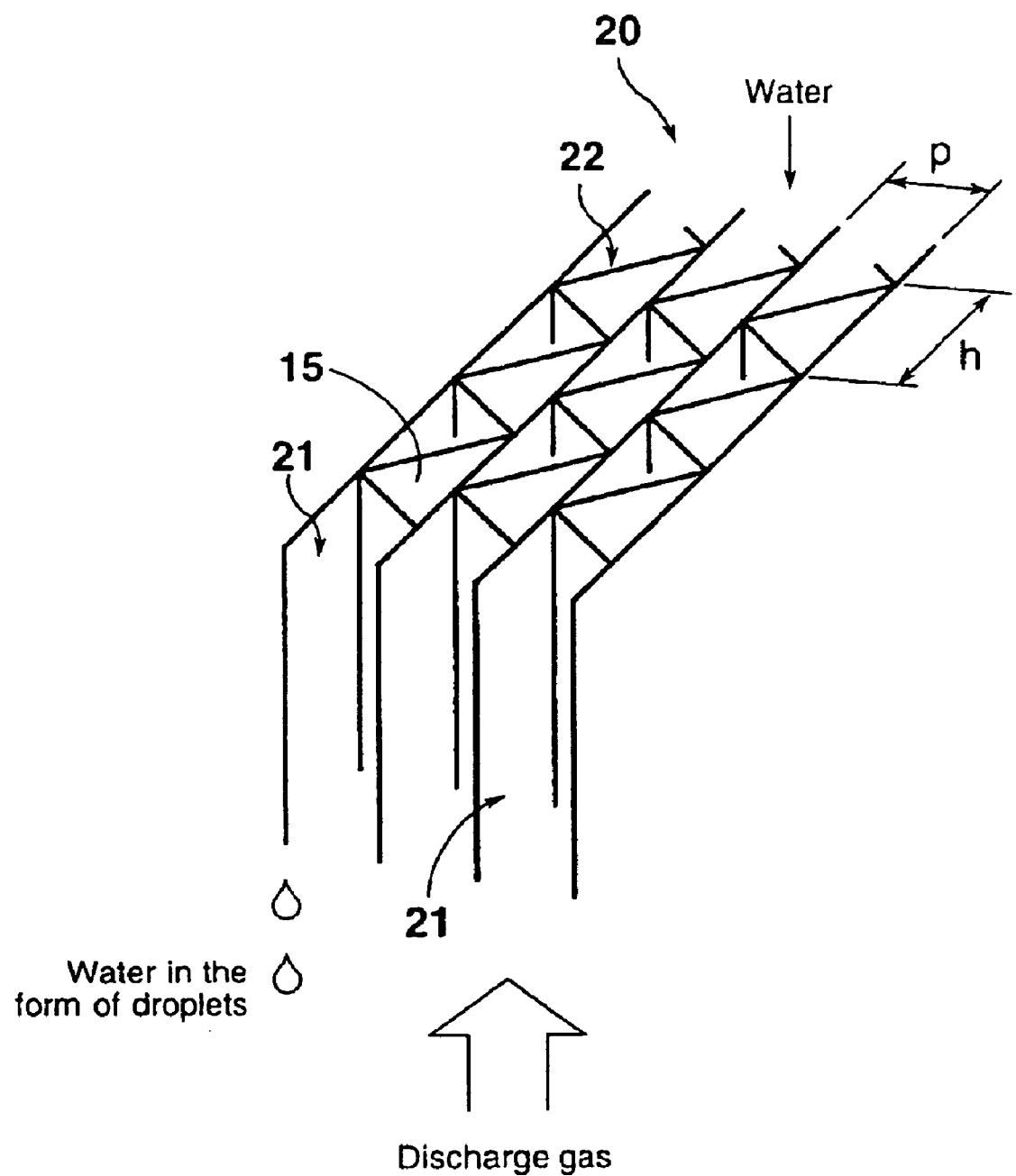
FIG. 4 is a perspective view showing a portion of an upper section of an activated carbon fiber board.
Figure 5:
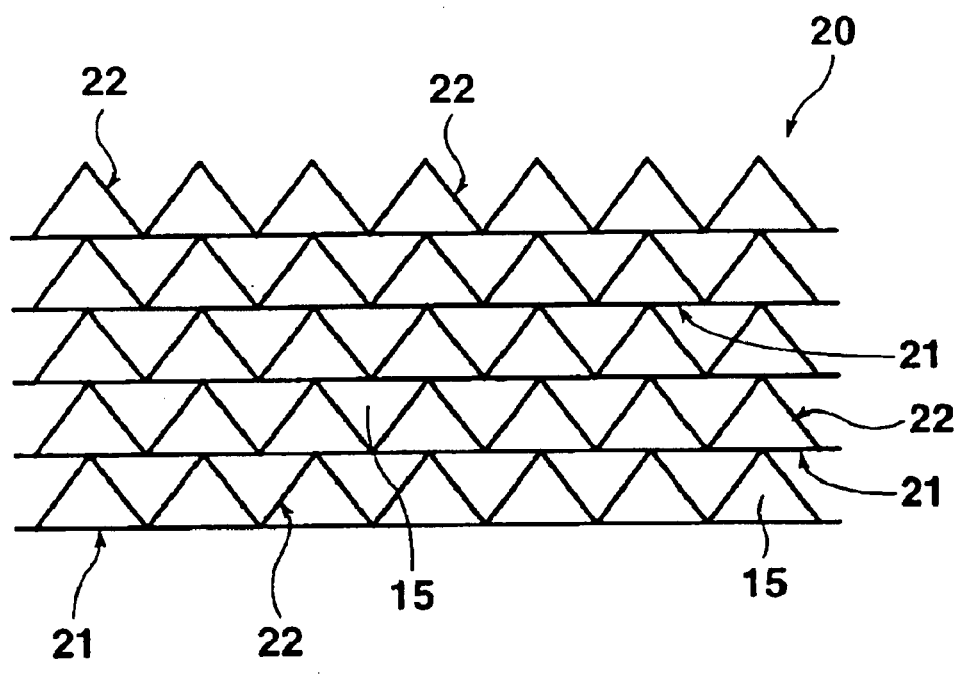
FIG. 5 is a cross-sectional view showing an activated carbon fiber board.

As shown in FIG. 4, the pitch p between plate-like activated carbon fiber sheets 21 is predetermined to be, for example, approximately 4 mm, and the width h of each protruded portion of the corrugated activated carbon fiber board 22 is predetermined to be, for example, approximately 10 mm. From a position above the activated carbon fiber boards, water is sprayed thereonto in the form of droplets approximately 200 μm in size, and a discharge gas is introduced from a position below the activated carbon fiber boards. Water which has passed through the activated carbon fiber boards 20 falls, in the form of droplets of about some mm in size, to the bottom of the desulfurization tower 4. The discharge gas passes through conduits 15 provided by alternatingly juxtaposing the plate-like activated carbon fiber sheets 21 and corrugated activated carbon fiber sheets 22. Thus, an increase in pressure loss can be suppressed.

$SO_3$ formed through oxidation of $SO_2$ on the surface of activated carbon fiber is transformed into sulfuric acid by water, and the sulfuric acid is discharged. When the amount of water is insufficient, discharge of sulfuric acid cannot be attained and subsequent oxidation of $SO_2$ is insufficient, whereas when the amount of water is excessive, the yielded sulfuric acid is diluted. Furthermore, when the amount of water further increases; for example, in the case where the activated carbon fiber is covered with a thin layer or a wall of water which covers active sites of the activated carbon fiber, such activated carbon fiber loses catalytic action of oxidizing $SO_2$, thereby failing to attain desulfurization or deteriorating desulfurization efficiency.

Therefore, the amount of water supplied when a discharge gas comes into contact with the activated carbon fiber boards 20 contained in the catalyst unit 6 is predetermined such that water is sprayed thereonto in the form of droplets of approximately 200 μm in size from a position above the activated carbon fiber boards 20, and such that water which has passed through the activated carbon fiber boards 20 falls, in the form of droplets of about some mm in size, to the bottom of the desulfurization tower 4. Accordingly, water falls intermittently in the form of spherical droplets, although falling conditions depend on the conditions of the discharge gas. Thus, water can be supplied to the surface of activated carbon fiber in a sufficient, yet not excessive amount, and sulfuric acid can be released at high efficiency. As a result, desulfurization of a discharge gas can be effectively performed.

Figure 6A:
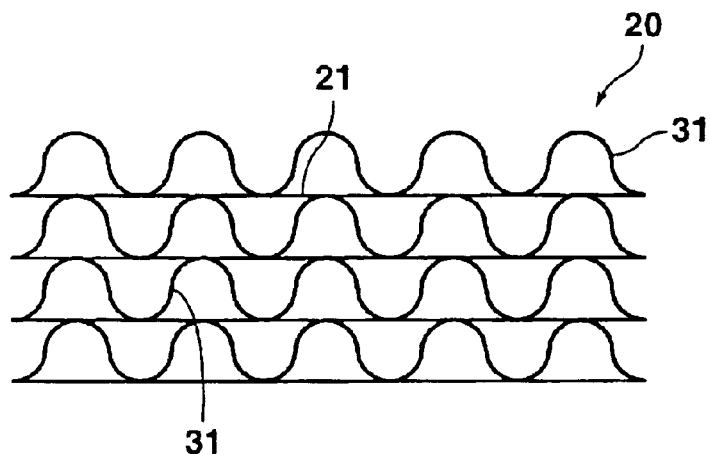
FIG. 6 is a cross-sectional view showing activated carbon fiber boards according to other embodiments.
Figure 6B:
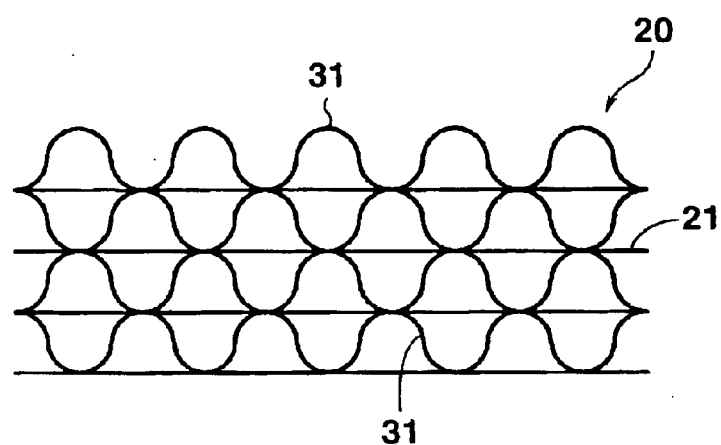
Figure 6C:
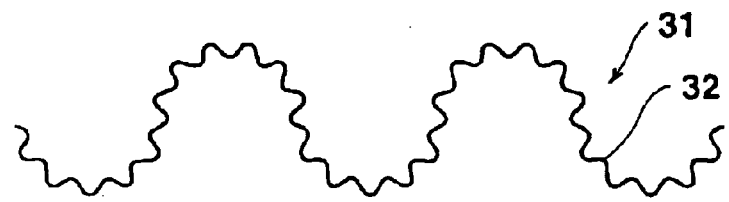

As shown in FIG. 6(A), the corrugated activated carbon fiber sheet 31 may be formed so as to have a continuous U-shape pattern, and a plurality of the corrugated activated carbon fiber sheets 31 and plate-like activated carbon fiber sheets 21 are alternatingly juxtaposed such that the U-shape patterns are oriented in the same direction. Alternatively, as shown in FIG. 6(B), a plurality of the corrugated activated carbon fiber sheets 31 and plate-like activated carbon fiber sheets 21 are alternatingly juxtaposed such that the orientation of the U-shape pattern is alternatingly disposed. Alternatively, as shown in FIG. 6(C), minute raised/dented patterns 32 may be provided in the surface of the corrugated activated carbon fiber sheets 31.

Figure 7:
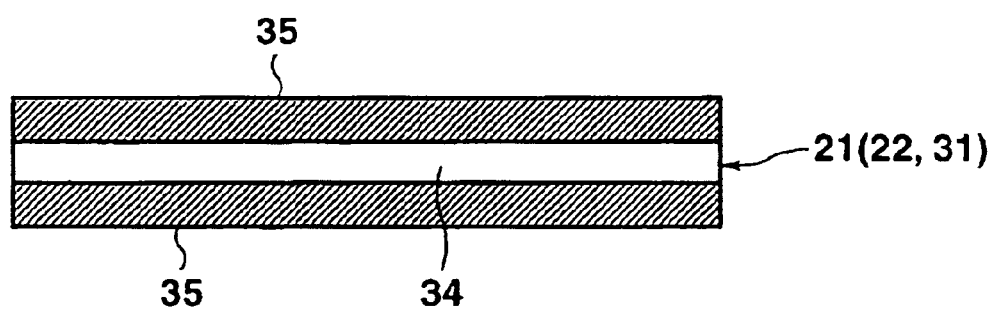
FIG. 7 is a cross-sectional view showing an activated carbon fiber sheet.

As illustrated in FIG. 7, a plate-like activated carbon fiber sheet 21 and corrugated activated carbon fiber sheets 22 and 31 are produced by tightly attaching a fired carbon sheet 35 on each side of a core material 34, to thereby form a laminated board. The core material 34 may be omitted.

Figure 3:
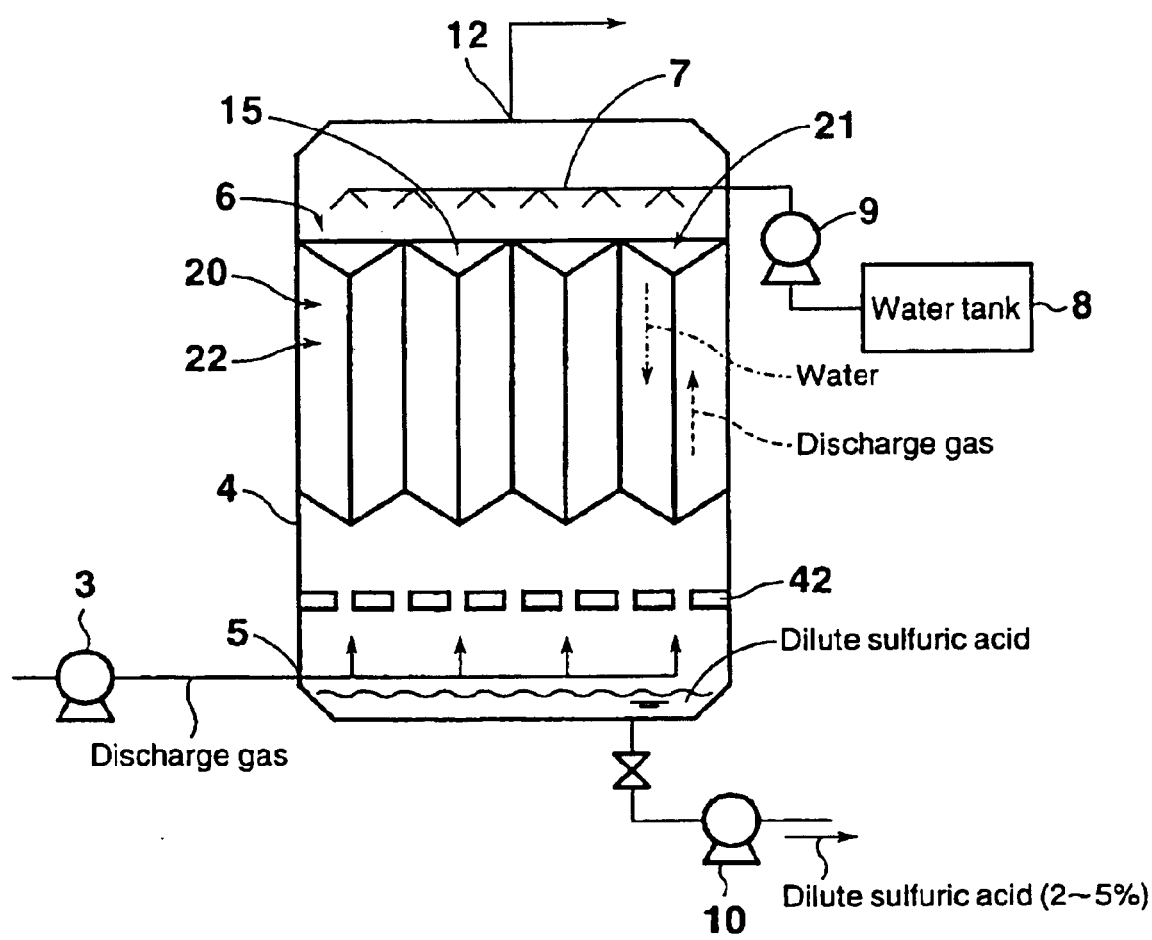
FIG. 3 is a schematic configuration of a desulfurization tower.

As shown in FIG. 3, the discharge gas is compressed by a compressor 3, and the thus-pressure-elevated gas is fed from an inlet 5 into a desulfurization tower 4. The discharge gas is distributed by means of a distributor 42, and the distributed gas is fed to a catalyst unit 6. The pressure of water supplied from a water tank 8 is elevated by use of a pressurizing pump 9 serving water-pressurizing means such that the pressure of water supplied from a water-supplying nozzle 7 is elevated to a suitable pressure determined in accordance with the pressure of the discharge gas. Thus, desulfurization is performed while pressure of the discharge gas and water passing through activated carbon fiber board 20 is elevated. In addition, the compressor 3 for compressing discharge gas facilitates elevating pressure of the discharge gas.

The desulfurization tower 4 has an air-tight structure such that the pressure of discharge gas and that of water are maintained.

Figure 8:
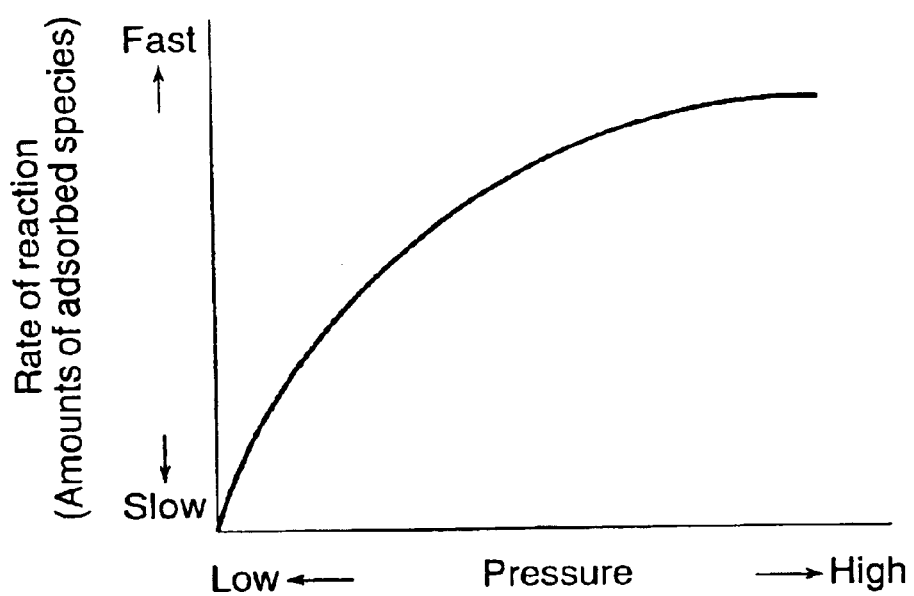
FIG. 8 is a graph showing the relationship between rate of reaction and pressure.

As shown in FIG. 8, rate of reaction (i.e., amounts of adsorbed sulfur dioxide ($SO_2$) and oxygen ($O_2$)) increases as pressure of the fluid passing through the activated carbon fiber boards 20 is elevated. Thus, adsorption of sulfur dioxide ($SO_2$) and oxygen ($O_2$) onto the activated carbon fiber board 20 can be promoted. In other words, the amounts of adsorbed sulfur dioxide ($SO_2$) and oxygen ($O_2$) can be increased without increasing the surface area (i.e., size) of the activated carbon fiber board 20.

Accordingly, there can be provided a flue gas processing apparatus having the catalyst unit 6 formed of at least one activated carbon fiber board 20, wherein adsorption of sulfur components is promoted, thereby elevating desulfurization efficiency.

Figure 9:
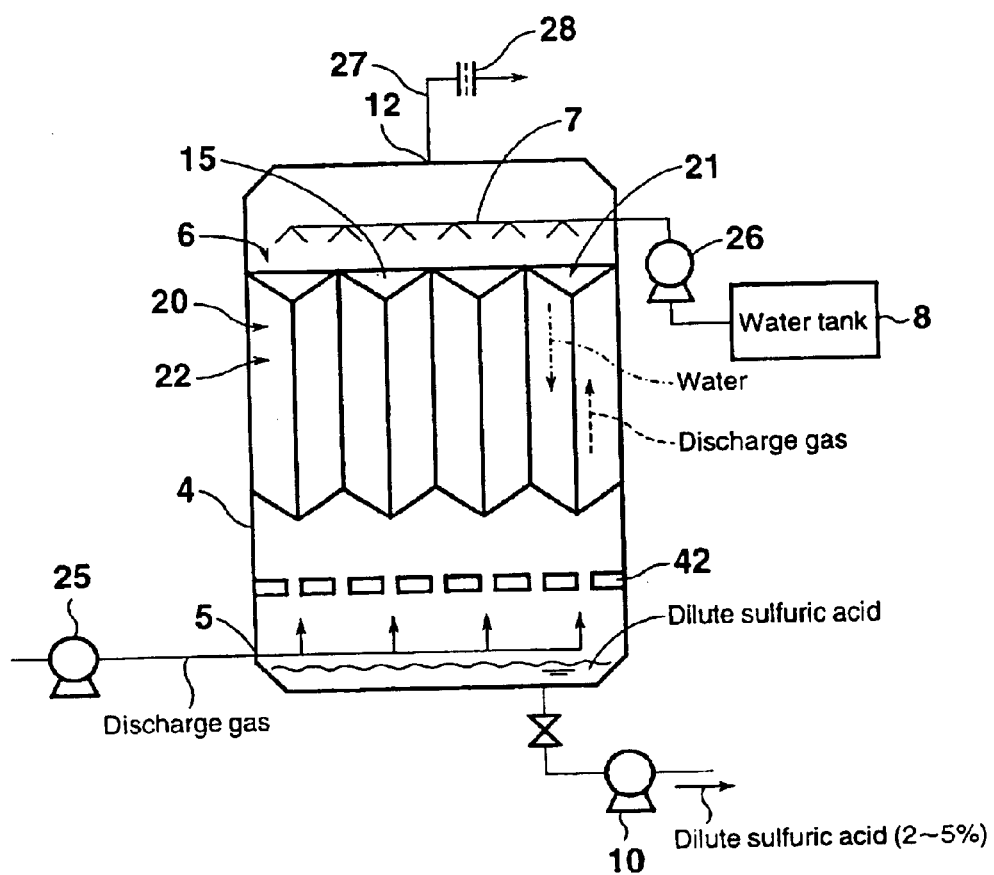
FIG. 9 is a schematic configuration of a desulfurization tower equipped with pressurizing means according to another embodiment.

With reference to FIG. 9, pressurizing means according to another embodiment of the present invention will be described. FIG. 9 shows the schematic configuration of a desulfurization tower equipped with pressurizing means according to another embodiment. Herein, the same members as shown in FIG. 3 are denoted by the same reference numerals, and repeated descriptions thereof are omitted.

As shown in FIG. 9, the discharge gas from which soot has been removed by means of a soot-collector 2 (see FIGS. 1 and 2) is fed to a desulfurization tower 4 from an inlet 5 by means of a feed pump 25. Water is fed from a water tank 8 to a water-supplying nozzle 7 by means of a pump 26. The discharge gas and water are caused to pass through an activated carbon fiber board 20, whereby desulfurization is performed.

In an outlet line 27 connecting an outlet 12 with a mist-eliminator 19 (see FIGS. 1 and 2), a restriction member 28 serving as resistance means is provided, whereby flow resistance is imparted to the discharge gas fed from the outlet line 27. Since the discharge gas is continuously fed into the desulfurization tower 4 by means of the feed pump 25, internal pressure of the desulfurization tower 4 gradually increases when the discharge gas is imparted with flow resistance by the restriction member 28, whereby pressure-elevated discharge gas and water are supplied. Thus, desulfurization is performed while pressure of the discharge gas and water passing through activated carbon fiber board 20 is elevated. According to this embodiment, the internal pressure of the desulfurization tower 4 is increased through provision of the restriction member 28. Therefore, pressure can be applied to the discharge gas and water without employment of special driving means.

Thus, adsorption of sulfur dioxide ($SO_2$) and oxygen ($O_2$) onto the activated carbon fiber board 20 can be promoted. In other words, the amounts of adsorbed sulfur dioxide ($SO_2$) and oxygen ($O_2$) can be increased without increasing the size of the activated carbon fiber board 20.

Accordingly, there can be provided a flue gas processing apparatus having the catalyst unit 6 formed of at least one activated carbon fiber board 20, wherein adsorption of sulfur components is promoted, thereby elevating desulfurization efficiency.

Figure 10:
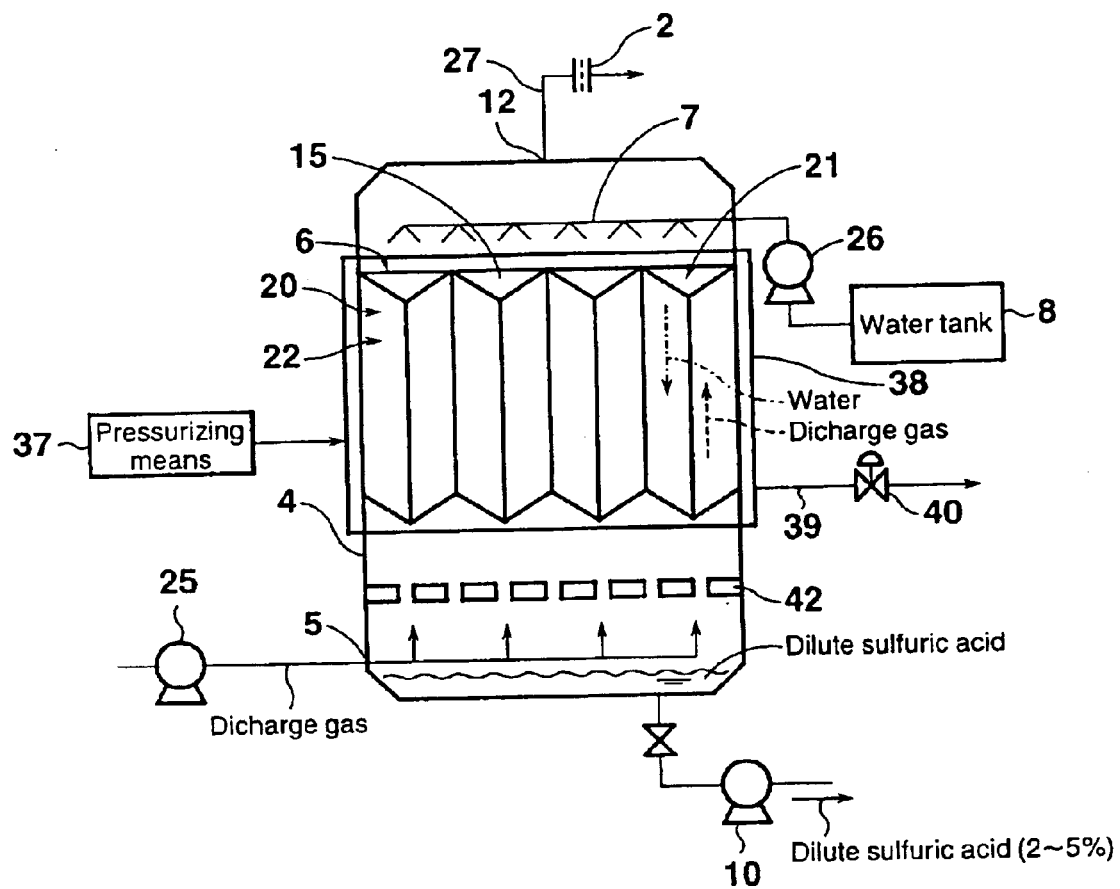
FIG. 10 is a schematic configuration of a desulfurization tower equipped with pressurizing means according to another embodiment.

With reference to FIG. 10, pressurizing means according to another embodiment of the present invention will be described. FIG. 10 shows the schematic configuration of a desulfurization tower equipped with pressurizing means according to another embodiment. Herein, the same members as shown in FIG. 3 or 9 are denoted by the same reference numerals, and repeated descriptions thereof are omitted.

As shown in FIG. 10, a desulfurization tower 4 includes a pressurizing chamber 38 whose internal pressure is elevated to a predetermined level by pressurizing means 37. The pressurizing chamber 38 accommodates a catalyst unit 6 containing an activated carbon fiber board 20. To the pressurizing chamber 38, a pressure-reducing line 39 is connected. A pressure-reducing valve 40 is provided in the pressure-reducing line 39. The pressure-reducing line 39 establishes its communication when the pressure-reducing valve 40 opens, whereby the internal pressure of the pressurizing chamber 38 is reduced.

The discharge gas from which soot has been removed by means of a soot-collector 2 (see FIGS. 1 and 2) is fed to the desulfurization tower 4 from an inlet 5 by means of a feed pump 25. The discharge gas fed into the tower is introduced into the pressurizing chamber 38 via a guide member (not illustrated). Water is fed from a water tank 8 to a water-supplying nozzle 7 by means of a pump 26. The water is introduced from the water-supplying nozzle 7 into the pressurizing chamber 38 via a guide member (not illustrated). The discharge gas and water are caused to pass through an activated carbon fiber board 20 accommodated in the pressurizing chamber 38, whereby desulfurization is performed under pressure application. The gas which has been desulfurized is removed from the pressurizing chamber 38.

Thus, adsorption of sulfur dioxide ($SO_2$) and oxygen ($O_2$) onto the activated carbon fiber board 20 can be promoted. In other words, the amounts of adsorbed sulfur dioxide ($SO_2$) and oxygen ($O_2$) can be increased without increasing the size of the activated carbon fiber board 20. In addition, application of pressure to the discharge gas and water can be ensured through provision of the pressurizing chamber 38.

Accordingly, there can be provided a flue gas processing apparatus having the catalyst unit 6 formed of at least one activated carbon fiber board 20, wherein adsorption of sulfur components is promoted, thereby elevating desulfurization efficiency.

When the pressure-reducing valve 40 is opened at an appropriate timing, to thereby reduce the pressure in the pressurizing chamber 38, fluid and micro-particles contained in the pressurizing chamber 38 are forcedly removed through the pressure-reducing line 39. Thus, undesired mist and micro-particles clogging the activated carbon fiber board 20 can be removed. When the pressure-reducing valve 40 is periodically opened so as to reduce the pressure in the pressurizing chamber 38, clogging of the activated carbon fiber board 20 can be prevented.

The compressor 3 or the pressurizing pump 9 shown in FIG. 3 may be provided instead of the feed pump 25 or the pump 26.

According to the aforementioned flue gas processing apparatus, pressure-elevated discharge gas and water are caused to pass through the catalyst unit 6. Thus, there can be provided a flue gas processing apparatus having the catalyst unit 6 formed of at least one activated carbon fiber board, wherein adsorption of sulfur components is promoted, thereby elevating desulfurization efficiency. According to the aforementioned desulfurization method, pressure is applied to discharge gas and water, to thereby cause the discharge gas and water to pass through the catalyst unit 6. Thus, there can be provided a desulfurization method wherein adsorption of sulfur components is promoted, thereby effectively removing sulfur oxides ($SO_x$).

The present invention provides a flue gas processing apparatus including a catalyst unit formed of at least one activated carbon fiber board, and water-supply means for supplying, to the catalyst unit, water for forming sulfuric acid, the catalyst unit being provided in the apparatus in the form of a tower through which a discharge gas containing sulfur oxide passes, the water-supply means being provided above the catalyst unit or in an upper section of the unit and in the apparatus in the form of a tower, characterized in that the activated carbon fiber board provided in the catalyst unit is formed by alternatingly juxtaposing one or more plate-like activated carbon fiber sheets and one or more corrugated activated carbon fiber sheets so as to provide vertically extending conduits, and in that the flue gas processing apparatus comprises pressurizing means for applying pressure to the discharge gas, to thereby cause the gas to pass through the catalyst unit. Thus, the pressure-elevated discharge gas is desulfurized by causing the gas to pass through the catalyst unit. As a result, adsorption of sulfur components is promoted, thereby effectively performing desulfurization.

When the pressurizing means is compressing means for compressing the discharge gas, to thereby cause the gas to pass through the catalyst unit, pressure can be readily applied to the discharge gas.

When the flue gas processing apparatus includes water-pressurizing means for applying pressure to the water for forming sulfuric acid, to thereby supply the water to the catalyst unit, the pressure-elevated discharge gas is desulfurized by causing the gas to pass through the catalyst unit to which pressure-elevated water is supplied.

When the pressurizing means is resistance means for imparting flow resistance to a discharged outlet gas, the resistance means being provided in an outlet line for feeding the outlet gas discharged from the apparatus in the form of a tower, pressure can be applied to the discharge gas without employment of special driving means.

When the catalyst unit is accommodated in a pressurizing chamber for applying desired pressure, and the discharge gas is caused to pass through the pressurizing chamber and water is supplied to the pressurizing chamber, application of pressure to the discharge gas and water can be ensured.

When the flue gas processing apparatus further contains pressure-reducing means for reducing pressure in the pressurizing chamber, to thereby remove fluid contained in the chamber, micro-particles or similar substances contained in the pressurizing chamber can be also removed, to thereby prevent clogging of the catalyst unit.

The present invention provides a desulfurization method including causing a discharge gas containing sulfur oxides to pass through a catalyst unit formed of at least one activated carbon fiber board and supplying water for forming sulfuric acid, characterized by comprising applying pressure to the discharge gas, to thereby cause the gas to pass through the catalyst unit. Therefore, adsorption of sulfur components is promoted, thereby effectively removing sulfur oxides. The present invention also provides a desulfurization method comprising applying pressure to a discharge gas, to thereby cause the gas to pass through vertically extending conduits formed by alternatingly juxtaposing one or more plate-like activated carbon fiber sheets and one or more corrugated activated carbon fiber sheets forming an activated carbon fiber board provided in a catalyst unit, and applying pressure to water for forming sulfuric acid, to thereby supply the water. Therefore, adsorption of sulfur components is promoted, thereby effectively removing sulfur oxides.

When pressure is applied to the water for forming sulfuric acid, to thereby supply the water, pressure can be applied to both the discharge gas and water.

The present invention also provides a desulfurization method including causing a discharge gas containing sulfur oxides to pass through a catalyst unit formed of at least one activated carbon fiber board and supplying water for forming sulfuric acid, characterized by comprising applying pressure to the catalyst unit, to thereby cause the discharge gas to pass through the catalyst unit, and reducing the pressure applied to the catalyst unit, to thereby discharge material contained in the catalyst unit. Thus, there can be provided a desulfurization method which promotes adsorption of sulfur components, thereby effectively removing sulfur oxides, and which can remove fluid, micro-particles, or similar substances, to thereby prevent clogging of the catalyst unit.

Figure 11:
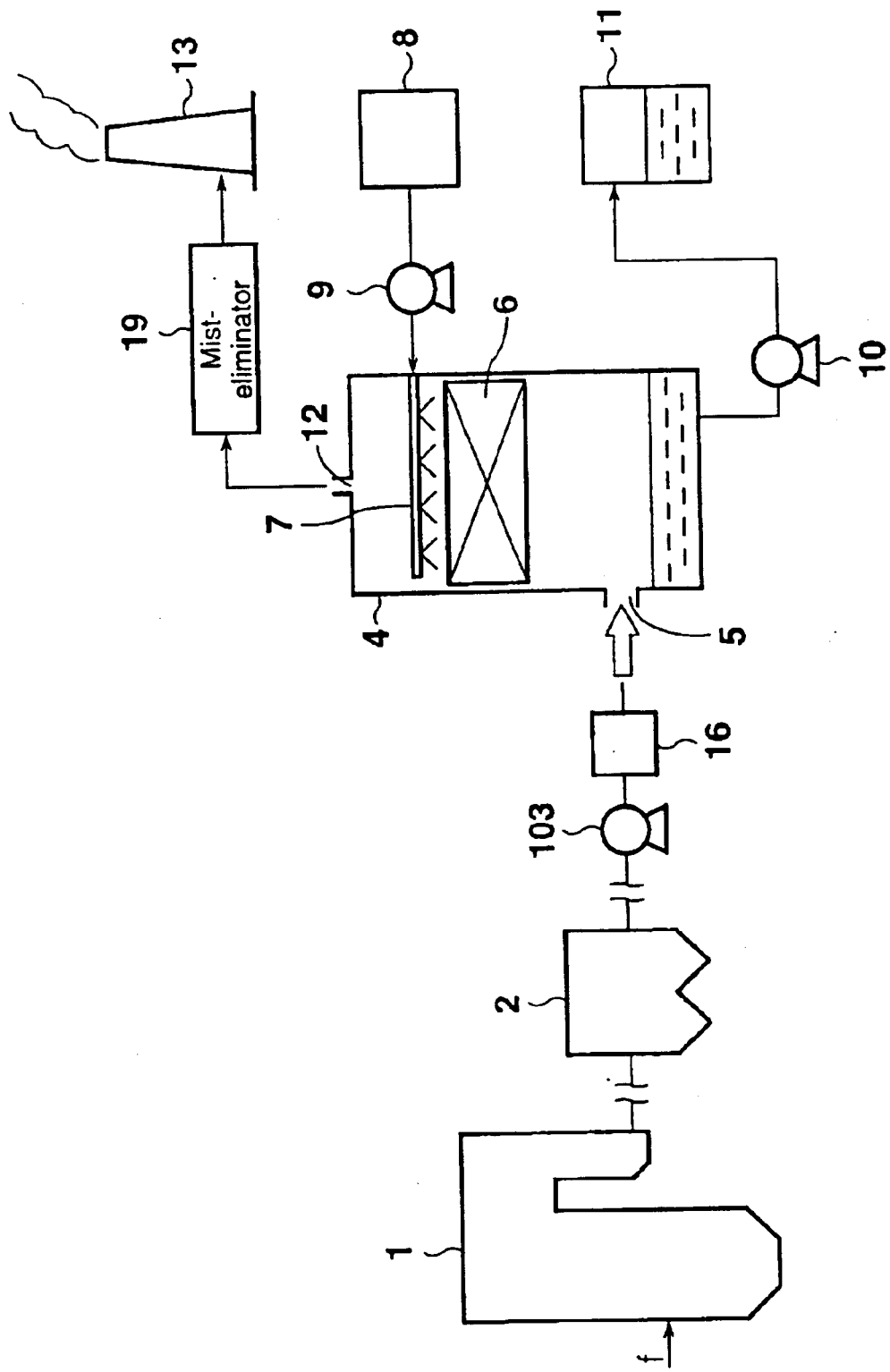
FIG. 11 is a system configuration of a discharge gas processing system employing a flue gas processing apparatus according to another embodiment of the present invention.
Figure 12:
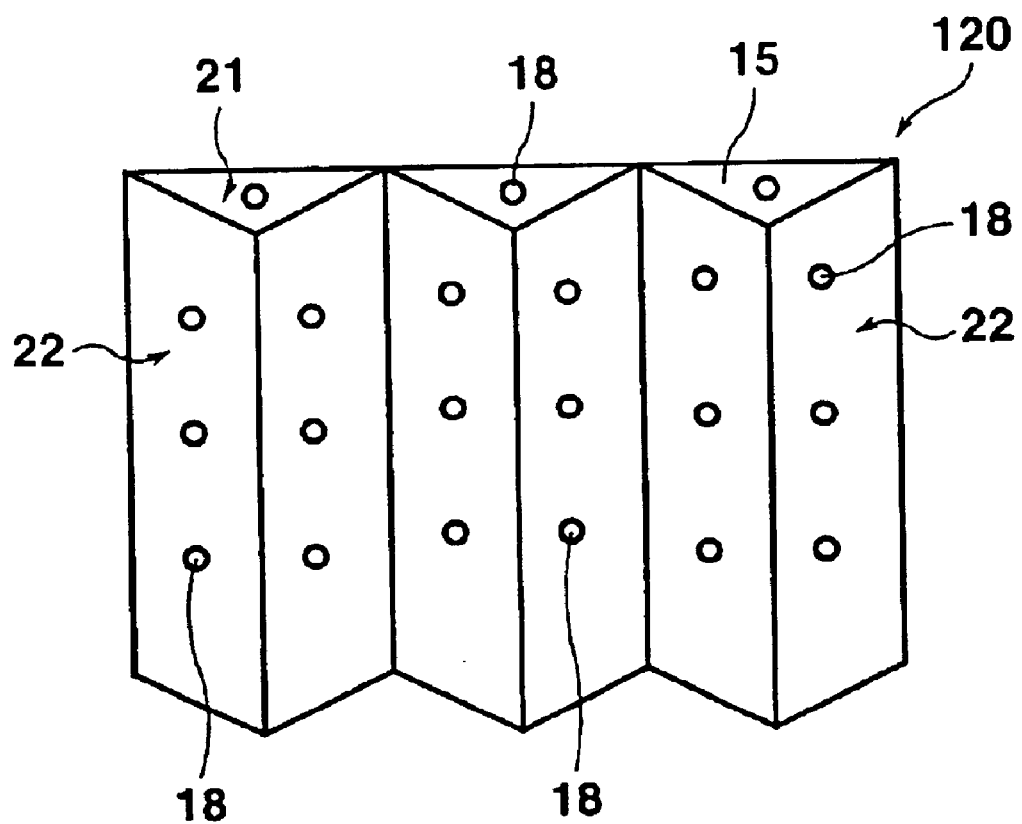
FIG. 12 is an elevation showing an essential portion of an activated carbon fiber board of another embodiment for forming the catalyst unit.
Figure 13:
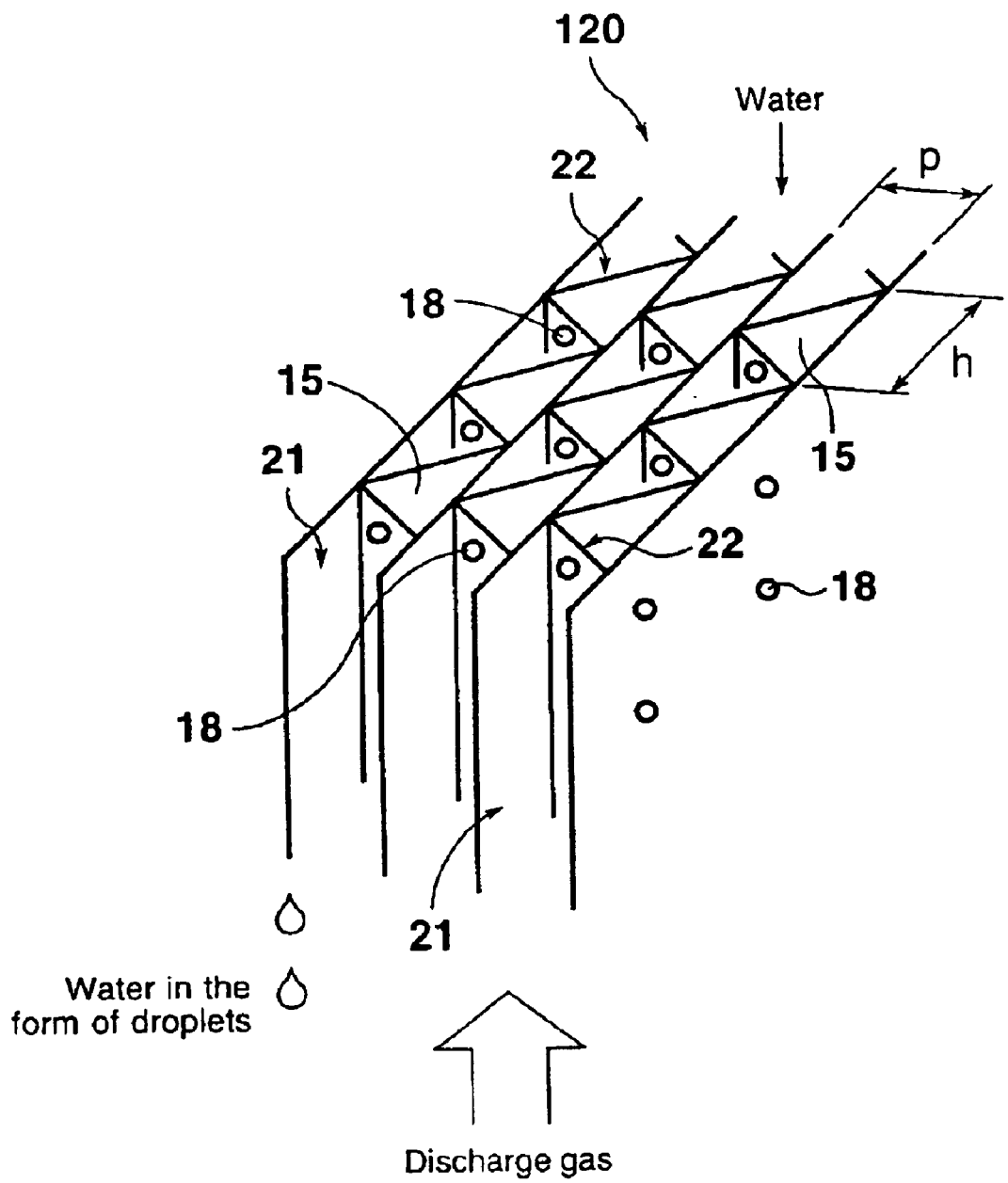
FIG. 13 is a perspective view showing a portion of an upper section of the activated carbon fiber board.

With reference to FIG. 11, a flue gas processing apparatus according to another embodiment of the present invention will be described. According to this embodiment, supplied water is allowed to be present evenly over the catalyst unit so as to enhance desulfurization efficiency.

FIG. 11 shows a discharge gas processing system employing a flue gas processing apparatus according to another embodiment of the present invention, and the essential structure thereof is the same as shown in FIG. 1. Specifically, as shown in FIG. 11, a boiler 1; for example, a boiler for generating steam for driving a steam turbine (not illustrated) of a thermal power plant, combusts fuel f (e.g., coal or heavy oil) in its furnace. A discharge gas generated from the boiler 1 contains sulfur oxides ($SO_x$). The discharge gas undergoes a $NO_x$ removal process by means of an $NO_x$ removal unit (not illustrated), is cooled by means of a gas heater, and subsequently undergoes a soot removal process by means of a soot collector 2.

The soot-removed discharge gas is fed, by means of a feed fan 103, to a humidifying-cooling apparatus 16, where water (including dilute sulfuric acid) is added, to thereby yield a discharge gas in saturated vapor form. The thus-humidified discharge gas may contain mist. The discharge gas in saturated vapor form produced in the humidifying-cooling apparatus 16 is fed to a desulfurization tower 4 (desulfurization apparatus in the form of a tower) via an inlet 5 provided in a lower section of the tower. The desulfurization tower 4 contains a catalyst unit 6 formed of at least one activated carbon fiber board, and water for producing sulfuric acid is supplied to the catalyst unit 6 from a water-supplying nozzle 7 provided above the catalyst unit. Water is supplied to the water-supplying nozzle 7 from a water tank 8 by use of a pump 9. Water-supply means includes the water-supplying nozzle 7, the water tank 8, and the pump 9.

The discharge gas is introduced from the lower section of the tower and caused to pass through the catalyst unit 6 onto which water has been supplied, whereby $SO_x$ contained in the discharge gas is removed through reaction. The discharge gas which has passed through the catalyst unit 6 is discharged from an outlet 12, and mist contained in the discharged gas is removed by a mist-eliminator 19, whereby generation of white smoke is suppressed. The thus-treated discharge gas is released to the air through a chimney 13. The mist-eliminator 19 may be omitted.

On a surface of the activated carbon fiber board contained in the catalyst layer 6, desulfurization proceeds in accordance with the aforementioned reaction mechanism.

Similar to the case of the embodiment described with reference to FIG. 1, according to the system of the present embodiment, sulfur oxides contained in a discharge gas are removed by means of a desulfurization apparatus, whereby sulfuric acid is formed. The thus-released sulfuric acid ($H_2SO_4$) is dilute sulfuric acid and is discharged into a sulfuric acid tank 11 via a discharge pump 10. Also, as described with reference to FIG. 2 lime slurry may be fed to the resultant sulfuric acid, to thereby produce gypsum. The effects and action of the system are the same as described above.

The structure of the activated carbon fiber board contained in the catalyst unit 6 employed in the present embodiment will be described with reference to FIGS. 12 to 15.

The essential structure of an activated carbon fiber board 120 is the same as shown in FIGS. 4 to 7, and the same members thereof are denoted by the same reference numerals. Thus, repeated descriptions thereof are omitted.

Figure 14:
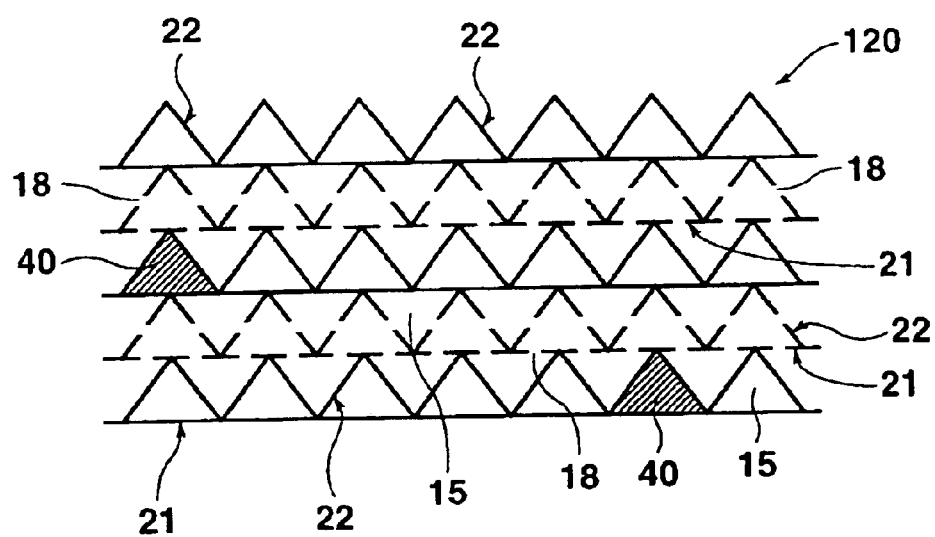
FIG. 14 is a cross-sectional view showing the activated carbon fiber board.
Figure 15:
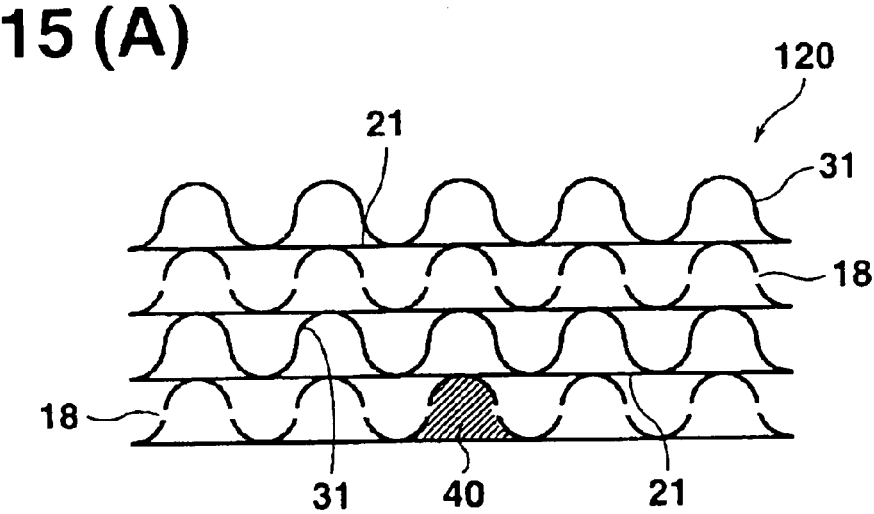
FIG. 15 is a cross-sectional view showing activated carbon fiber boards according to other embodiments.
Figure 15:
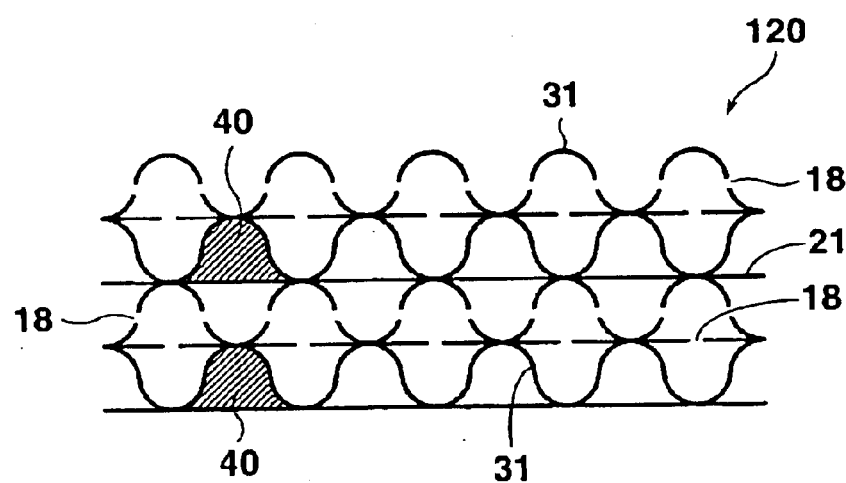

In the activated carbon fiber board 120, a large number of narrow conduits 15 are individually provided. Water for producing sulfuric acid is supplied to each conduit 15 from a position above the corresponding conduit 15, while a discharge gas is supplied from a lower section of the catalyst unit. Thus, when the pressure of water supplied from the upper position and that of the discharge gas supplied from the lower section are equilibrated, a water membrane 40 is formed in some conduits 15, thereby possibly clogging the corresponding conduits 15, as shown in FIGS. 14 and 15. Although clogging of the conduits 15 can be prevented by suppressing formation of the water membrane 40 through widening of the conduits 15, contact area between the surface of the activated carbon fiber board 120 and the discharge gas decreases, thereby failing to attain desired catalytic efficiency within a limited space.

In order to overcome the above drawback, as shown in FIGS. 12 to 15, holes 18 which allow passage of water and discharge gas between the conduits 15 are provided in sidewalls (corrugated activated carbon fiber sheets 22 and 31) forming the conduits 15 formed in the activated carbon fiber board 120. At least one (three in the case of FIG. 12) hole 18 is provided in the direction of flow in each conduit 15 (fluid flow direction), and the holes 18 are provided in a plurality of conduits 15 such that passage of water and discharge gas can be attained from one conduit 15 to all adjacent conduits 15.

Since a plurality of holes 18 are provided in each conduit 15 in the fluid flow direction, passage of water and discharge gas between the conduits 15 is ensured, even when the amount (weight) of supplied water or pressure of supplied discharge gas is not constant. In addition, since holes 18 are provided such that communication can be attained from one conduit 15 to all adjacent conduits 15, passage of water and discharge gas between the conduits 15 is ensured, even when the amount (weight) of water contained in the activated carbon fiber board 120 or pressure of supplied discharge gas passing through the activated carbon fiber board 120 is not evenly provided.

In the flue gas processing apparatus employing the aforementioned catalyst unit 6, holes 18 are provided in sidewalls of the conduits 15 formed in the activated carbon fiber board 120 included in the catalyst unit 6. Thus, even when the weight of water supplied from a position above the conduits and pressure of the discharge gas supplied from the lower section are equilibrated, the discharge gas (or water) passing through one conduit flows, via the holes 18, into another conduit 15 of lower pressure. As a result, decrease in pressure of the discharge gas allows falling of water, thereby preventing formation of the water membrane 40 in the conduits 15. Thus, inhibition of flow of the discharge gas caused by clogging of the conduits 15 is prevented, thereby attaining even flow of water and the discharge gas over the entirety of the activated carbon fiber board 120.

When the catalyst unit 6 is formed of a plurality of activated carbon fiber boards 120, which are vertically disposed, water is evenly supplied in a lower activated carbon fiber board 120, and the discharge gas is evenly supplied to an upper activated carbon fiber board 120. Through provision of such holes, even when the catalyst unit 6 is formed of a plurality of stages of activated carbon fiber boards 120, water and the discharge gas can be uniformly dispersed, thereby eliminating adverse effects on sulfur dioxide ($SO_2$) removal efficiency.

Thus, there can be provided a catalyst unit 6 having an activated carbon fiber board 120 in which water is evenly distributed, the catalyst unit allowing passage of the discharge gas without inhibition of flow under small pressure loss conditions. Even when narrower conduits 15 are provided; i.e., when contact area between the fluid and the activated carbon fiber board 120 increases, favorable flow conditions of the discharge gas can be maintained, and decrease in desulfurization efficiency can be prevented by evenly distributing water.

The flue gas processing apparatuses according to the aforementioned embodiments have been described in relation to the case where the discharge gas is fed from a lower section of the desulfurization tower 4 and discharged in the upper direction. However, no particular limitation is imposed on the positions of the inlet and the outlet, and there may be employed a mode of flow in which the discharge gas is fed from the top of the desulfurization tower 4 and discharged from a lower section thereof.

The present invention also provides a flue gas processing apparatus including a catalyst unit formed of at least one activated carbon fiber board, and water-supply means for supplying, to the catalyst unit, water for forming sulfuric acid, the catalyst unit being provided in the apparatus in the form of a tower through which a discharge gas containing sulfur oxide passes, the water-supply means being provided above the catalyst unit or in an upper section of the unit and in the apparatus in the form of a tower, characterized in that the activated carbon fiber board provided in the catalyst unit is formed by alternatingly juxtaposing one or more plate-like activated carbon fiber sheets and one or more corrugated activated carbon fiber sheets so as to provide vertically extending conduits, and in that one or more sidewalls forming the conduits; i.e., the corrugated activated carbon fiber sheets, have at least one hole which allows passage of the fluid between the conduits. With the above structure, even when pressure of water and pressure of the discharge gas are equilibrated, the discharge gas (or water) passing through one conduit flows, via the holes, into another conduit of lower pressure. Thus, inhibition of flow of the discharge gas caused by clogging of the conduits is prevented, thereby attaining even flow of water and the discharge gas over the entirety of the activated carbon fiber board. As a result, there can be provided a flue gas processing apparatus employing a catalyst unit formed of at least one activated carbon fiber board, the catalyst unit allowing passage of the discharge gas without inhibition of flow under even water distribution and small pressure loss conditions.

Since at least one hole is provided in each conduit in the fluid flow direction, passage of water and discharge gas between the conduits is ensured, even when the amount (weight) of water or pressure of supplied discharge gas is not constant.

In addition, since holes are provided such that communication can be attained from one conduit to all adjacent conduits, passage of water and discharge gas between the conduits is ensured, even when the pressure of water contained in the activated carbon fiber board or pressure of supplied discharge gas passing through the activated carbon fiber board is not evenly distributed.

When a catalyst unit is formed of a plurality of activated carbon fiber boards disposed and stacked in a vertical direction, the size of each activated carbon fiber board can be reduced, thereby facilitating assembly of the catalyst unit.

The catalyst units 6 contained in the desulfurization apparatus 4 employed in the embodiments shown in FIGS. 1, 2, 9, and 10 may be replaced by any one of the activated carbon fiber boards 120 shown in the FIGS. 12 to 14 and 15. According to such embodiments, pressure is applied to the discharge gas to be fed to the catalyst unit, and the discharge gas is allowed to flow between the conduits.

According to these embodiments, desulfurization is performed by causing the pressure-elevated discharged gas to pass through the catalyst unit, and adsorption of sulfur components is promoted, thereby effectively performing desulfurization. In addition, since holes which allow passage of fluid between conduits are provided in sidewalls forming conduits of the activated carbon fiber board, even when the pressure of water and pressure of the discharge gas are equilibrated, the discharge gas (or water) passing through one conduit flows, via the holes, into another conduit of lower pressure. Thus, inhibition of flow of the discharge gas caused by clogging of the conduits is prevented, thereby attaining even flow of water and the discharge gas over the entirety of the activated carbon fiber board. As a result, the discharge gas can be caused to pass without inhibition of flow under even water distribution and small pressure loss conditions.

INDUSTRIAL APPLICABILITY

As described hereinabove, the flue gas processing apparatus and the processing method according to the present invention can remove sulfur oxides contained in discharge gas efficiently. Thus, the apparatus and method are suitable for processing discharge gas generated by a boiler, a gas turbine, an engine, a combustion furnace, or a similar facility combusting a fuel such as coal or heavy oil.

What is claimed is:

1. A desulfurization method for a gas containing sulfur oxide, comprising:
   providing a catalyst unit including at least one activated carbon fiber board which adsorbs the sulfur oxide;
   supplying water to the catalyst unit so as to form sulfuric acid from the sulfur oxide; and
   applying pressure to the gas so as to flow the gas through the catalyst unit.

2. The desulfurization method according to claim 1, wherein the providing comprises providing the catalyst unit in a pressurizing chamber in which a pressure is applied to the gas passing through the pressurizing chamber and to the water supplied to the pressurizing chamber, and the pressure is higher than a pressure outside the pressurizing chamber.

3. A desulfurization method for a gas containing sulfur oxide, comprising:
   providing a catalyst unit including an activated carbon fiber board to which the sulfur oxide is adsorbed, the activated carbon fiber board having at least one activated carbon fiber sheet and at least one corrugated activated carbon fiber sheet positioned alternately in juxtaposition to form vertically extending conduits;
   applying pressure to the gas so as to flow the gas through the vertically extending conduits
   applying pressure to water so as to supply the water to the catalyst unit.

4. The desulfurization method according to claim 3, wherein the pressure is applied to the water so as to form sulfuric acid from the sulfur oxide adsorbed to the activated carbon fiber board.

5. A desulfurization method for a gas containing sulfur oxide, comprising:
   providing a catalyst unit including at least one activated carbon fiber board which adsorbs the sulfur oxide;
   supplying water to the catalyst unit so as to form sulfuric acid; from the sulfur oxide adsorbed to the at least one activated carbon fiber board;
   applying pressure to the catalyst unit so as to flow the gas through the catalyst unit by the pressure; and
   reducing the pressure applied to the catalyst unit so as to discharge material contained in the catalyst unit.

6. A flue gas processing apparatus for removing sulfur oxide contained in a gas, comprising:
   a desulfurization tower through which the gas flows, the desulfurization tower including a catalyst unit having at least one activated carbon fiber board which adsorbs the sulfur oxide and a water-supply device configured to supply water to the catalyst unit so as to form sulfuric acid from the sulfur oxide adsorbed to the at least one activated carbon fiber board, the water-supply device being positioned above the catalyst unit in the desulfurization tower; and
   a pressurizing device configured to apply pressure to the gas supplied to the desulfurization tower so as to flow the gas through the catalyst unit by the pressure,
   wherein the at least one activated carbon fiber board has at least one activated carbon fiber sheet and at least one corrugated activated carbon fiber sheet positioned alternately in juxtaposition so as to provide conduits extending vertically.

7. The flue gas processing apparatus according to claim 6, wherein the pressurizing device includes a compressing device configured to compress the gas, thereby causing the gas to pass through the catalyst unit.

8. The flue gas processing apparatus according to claim 7, further comprising a water-pressurizing device configured to apply pressure to the water so as to supply the water to the catalyst unit.

9. The flue gas processing apparatus according to claim 6, wherein the catalyst unit is positioned in a pressurizing chamber in which a pressure is applied to the gas passing through the pressurizing chamber and to the water supplied to the pressurizing chamber, and the pressure is higher than a pressure outside the pressurizing chamber.

10. The flue gas processing apparatus according to claim 9, wherein the pressurizing chamber includes a pressure reducing device configured to reduce the pressure in the pressurizing chamber so as to remove fluid contained in the pressurizing chamber.

11. The flue gas processing apparatus according to claim 6, wherein the desulfurization tower has an outlet line through which the gas is discharged, and the pressurizing device includes a resistance device configured to impart flow resistance to the gas discharged from the desulfurization tower.

12. The flue gas processing apparatus according to claim 6, wherein the at least one corrugated activated carbon fiber sheet has at least one hole which allows passage of fluid between the conduits.

13. The flue gas processing apparatus according to claim 6, wherein the at least one activated carbon fiber board includes a plurality of activated carbon fiber boards which are vertically disposed.

14. A flue gas processing apparatus for removing sulfur oxide contained in a gas, comprising:
- a desulfurization tower through which the gas flows, the desulfurization tower including a catalyst unit having at least one activated carbon fiber board which adsorbs the sulfur oxide, and a water-supply device configured to supply water to the catalyst unit so as to form sulfuric acid from the sulfur oxide adsorbed to the at least one activated carbon fiber board, the water-supply device being positioned in an upper section of the desulfurization tower; and
- a pressurizing device configured to apply pressure to the gas so as to flow the gas through the catalyst unit by the pressure,
- wherein the at least one activated carbon fiber board includes at least one activated carbon fiber sheet and at least one corrugated activated carbon fiber sheet positioned so as to provide conduits extending vertically, and the at least one corrugated activated carbon fiber sheet has at least one hole which allows passage of fluid between the conduits.

15. The flue gas processing apparatus according to claim 14, wherein the at least one activated carbon fiber board includes a plurality of activated carbon fiber boards which are vertically disposed.

16. An apparatus for removing sulfur oxide contained in a gas, comprising:
- a catalyst unit having at least one activated carbon fiber board which adsorbs the sulfur oxide;
- a water-supply device configured to supply water to the catalyst unit so as to form sulfuric acid from the sulfur oxide adsorbed to the at least one activated carbon fiber board; and
- a pressurizing device configured to apply pressure to the gas so as to flow the gas through the catalyst unit by the pressure.

17. An apparatus for removing sulfur oxide contained in a gas, comprising:
- a desulfurization tower through which the gas flows, the desulfurization tower including a catalyst unit having at least one activated carbon fiber board which adsorbs the sulfur oxide and a water-supply device configured to supply water to the catalyst unit so as to form sulfuric acid from the sulfur oxide adsorbed to the at least one activated carbon fiber board, the water-supply device being positioned above the catalyst unit in the desulfurization tower; and
- pressurizing means for applying pressure to the gas so as to flow the gas through the catalyst unit by the pressure,
- wherein the at least one activated carbon fiber board has at least one activated carbon fiber sheet and at least one corrugated activated carbon fiber sheet positioned alternately in juxtaposition so as to provide conduits extending vertically.

* * * * *

UNITED STATES PATENT AND TRADEMARK OFFICE
CERTIFICATE OF CORRECTION

PATENT NO. : 6,872,373 B2
DATED : March 29, 2005
INVENTOR(S) : Tatsuhara et al.

It is certified that error appears in the above-identified patent and that said Letters Patent is hereby corrected as shown below:

<u>Title page,</u>
Item [75], Inventors, should read
-- [75] Inventors: Kiyoshi Tatsuhara, Nagasaki (JP);
　　　　　　　　Akinori Yasutake, Nagasaki (JP);
　　　　　　　　Takashi Kurisaki, Nagasaki (JP);
　　　　　　　　Norihisa Kobayashi, Tokyo (JP) --

Signed and Sealed this

Thirty-first Day of May, 2005

JON W. DUDAS
*Director of the United States Patent and Trademark Office*